United States Patent
Esmail et al.

(10) Patent No.: US 10,965,728 B2
(45) Date of Patent: Mar. 30, 2021

(54) METHOD AND SYSTEM FOR AGGREGATING AND CONVERTING SENSOR DATA STREAMS

(71) Applicant: Tesla, Inc., Palo Alto, CA (US)

(72) Inventors: Adnan Esmail, Los Angeles, CA (US); Prashant Joshi, Santa Clara, CA (US); Sundar Balasubramaniam, Pleasanton, CA (US); Brijesh Tripathi, Los Altos, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 16/659,432

(22) Filed: Oct. 21, 2019

(65) Prior Publication Data

US 2020/0128061 A1    Apr. 23, 2020

Related U.S. Application Data

(60) Provisional application No. 62/748,882, filed on Oct. 22, 2018.

(51) Int. Cl.

| | |
|---|---|
| *H04W 4/38* | (2018.01) |
| *H04L 29/06* | (2006.01) |
| *H03M 7/30* | (2006.01) |
| *H04W 4/48* | (2018.01) |
| *H04L 9/06* | (2006.01) |

(52) U.S. Cl.
CPC ............ *H04L 65/607* (2013.01); *H03M 7/30* (2013.01); *H03M 7/3059* (2013.01); *H04L 9/065* (2013.01); *H04L 65/608* (2013.01); *H04W 4/38* (2018.02); *H04W 4/48* (2018.02)

(58) Field of Classification Search
CPC ..... H04L 65/608; H04L 65/607; H04L 65/80; H04L 43/18; H04L 67/42; H04L 9/065; H03M 7/3059; H03M 7/30; G01C 21/3415; G05D 1/0088; G06F 13/4282; G06F 21/606; G08G 1/161; H04N 5/247; H04R 1/326; H04W 28/06; H04W 4/38; H04W 4/48
See application file for complete search history.

(56) References Cited

U.S. PATENT DOCUMENTS

| | | | |
|---|---|---|---|
| 2011/0191011 A1* | 8/2011 | McBride | H04W 28/06 701/117 |
| 2012/0081519 A1* | 4/2012 | Goma | H04N 5/247 348/47 |
| 2016/0171789 A1* | 6/2016 | Moon | G08G 1/161 709/224 |
| 2017/0289646 A1* | 10/2017 | Kanthapanit | H04R 1/326 |
| 2018/0109696 A1* | 4/2018 | Thanigasalam | G06F 21/606 |

(Continued)

*Primary Examiner* — Le H Luu
(74) *Attorney, Agent, or Firm* — Knobbe, Martens, Olson & Bear, LLP (57) ABSTRACT

A method and system of aggregating and converting data in a vehicle network is provided. An example method includes receiving a plurality of streams of sensor data over two or more Camera Serial Interface (CSI). The method further includes rearranging the plurality of streams of sensor data into an aggregate stream. The method further includes packetizing the aggregate stream by arranging transmission format bits at appropriate bit positions of the aggregate stream to form a packet data stream. The method further includes transmitting the packet data stream over a vehicle on-board packet data link.

19 Claims, 5 Drawing Sheets

(56) References Cited

U.S. PATENT DOCUMENTS

| | | | |
|---|---|---|---|
| 2018/0146023 A1* | 5/2018 | Park | H04L 65/80 |
| 2019/0049267 A1* | 2/2019 | Huang | G01C 21/3415 |
| 2019/0057051 A1* | 2/2019 | Herrmann | G06F 13/4282 |
| 2019/0075149 A1* | 3/2019 | Lu | H04L 67/42 |
| 2019/0138524 A1* | 5/2019 | Singh | H04L 43/18 |
| 2019/0250610 A1* | 8/2019 | Luo | G05D 1/0088 |

* cited by examiner

METHOD AND SYSTEM FOR AGGREGATING AND CONVERTING SENSOR DATA STREAMS

CROSS-REFERENCE TO RELATED APPLICATIONS

This application claims priority to U.S. Prov. App. No. 62/748,882, which was filed on Oct. 22, 2018 and which is entitled "METHOD AND SYSTEM FOR AGGREGATING AND CONVERTING SENSOR DATA STREAMS" the contents of which is hereby incorporated herein by reference in its entirety.

Any and all applications for which a foreign or domestic priority claim is identified in the Application Data Sheet as filed with the present application are hereby incorporated by reference in their entirety under 37 CFR 1.57.

BACKGROUND

Technical Field

The present disclosure relates to handling sensor data streams in a vehicle. More particularly, the present disclosure relates to aggregating and converting the format of sensor data streams in a vehicle network.

Description of Related Art

Traditional vehicular networks have a large number of point-to-point links between the vehicle computer and various vehicular subsystems. Modern vehicles have a number of cameras, detection sensors such as ultrasonic sensors, and ranging sensors such as RADARs. State of the art systems are not readily scalable to manage the data flow coming from ever greater numbers of such sensors. For example, scaling current systems for higher throughput, or a greater number of sensors, may directly result in added harness complexity and subsequently more difficult troubleshooting for technicians attempting to repair such equipment.

Hence, there is a need for a vehicle communication network and communication method to alleviate these and other drawbacks of state of the art.

DETAILED DESCRIPTION

The present disclosure relates to a vehicle onboard network system, and methods of communication deployed between the various components of the network. In one embodiment, the vehicle onboard network described herein aggregates data streams coming from network components, such as cameras, such that only a single data stream from those components interfaces with the host processing system. This may allow for substantially high network speeds as compared to prior techniques, such that a multitude of sensors may transmit information via the vehicle onboard network across one or more aggregated data streams. As may be appreciated, these sensors may be used by a vehicle for disparate purposes. For example, information from certain sensors may be used to perform self-driving processes. As another example, information from certain sensors may be used to perform certain emergency processes (e.g., auto-braking when a pedestrian is near). Being able to reliably transmit this sensor information (herein also referred to as sensor data) to a central processing system may thus be paramount to the proper functioning of the vehicle.

Example sensor information may include images, radar information, and so on. With respect to a sensor being an imaging device (e.g., a camera), the imaging device may transmit images via the vehicle onboard network to a particular location (e.g., a central processing system). Each of these images may be, for example, several megabytes. Additionally, the images may be transmitted at a particular frequency (e.g., 30 times per second, 60 times per second, and so on). For certain vehicles, there may be 5, 10, 15, of these image devices. Thus, the bandwidth requirements for a vehicle onboard network may be great.

As will be described, this specification describes an example processor which may enable transmission of sensor information from multitudes of sensors. The processor, referred to herein as a host processor, may represent an example of a custom application specific integrated circuit. Optionally, the example processor may be implemented using a general purpose processor and/or may represent software executing on a general purpose processor. Sensors, as described above, may be used by a vehicle for differing processes. With respect to self-driving, the vehicle may aggregate sensor information from sensors spread about the vehicle. Advantageously, a vehicle may include one or more of these example processors to transmit aggregated sensor information to a particular location (e.g., a central processing system). As will be described, the processors may advantageously be used to provide for the above-described bandwidth requirements.

In prior techniques, each of the above-described sensors may be directly connected to a central processing system. For example, prior techniques may rely upon point to point connections in which a sensor is wired to a central processing system. These prior techniques may thus increase a complexity associated with wiring as each sensor component requires a connection to the host processor. Additionally, there may be substantial complexity in handling a sensor wire which has become disconnected, severed, and so on. During a lifetime of a vehicle, it may be advantageous to adjust the vehicle's sensors. For example, a vehicle may benefit from additional cameras being placed about the vehicle. As another example, a vehicle may benefit from swapping higher resolution sensors, or sensors which are sensitive to different wavelengths, into the vehicle. The complexity associated with adjusting the sensors in older generation vehicles may be prohibitive, such that the vehicles may be unable to benefit from such adjustments.

Advantageously, the vehicle network system described herein can be used to aggregate sensor information from all, or a subset, of the sensors included in a vehicle. For example, the processor may aggregate the sensor information and transmit one data stream to a particular location (e.g., a central processing system). In some embodiments, one or more processors may aggregate sensor information from sensors located proximate (e.g., within a threshold distance) to each processor. In these embodiments, the processors may thus receive sensor information from sensors local to each processor. As new sensors are included in a vehicle, the sensors may be connected to a particular local processor located proximate to the new sensors. In this way, wiring complexity may be reduced.

In some embodiments, and in addition to aggregating sensor information from different sensors, the processor described herein may enable repeating of sensor information. For example, a first host processor may aggregate information from a threshold number of sensors. In this example, the first host processor may transmit a stream to a second host processor. The second host processor, as an example, may receive streams from the first processor and one or more other processors. The second host processor may then transmit information from the received streams to a particular location. As an example, the particular location may be a central processing system or one or more other processors. In this way, the processors may be used to route information throughout a vehicle.

As an example, a first host processor may receive sensor information from sensors located at a left-rear of a vehicle. In this example, a second processor may receive sensor information from sensors located at a right-rear of a vehicle. The first host processor and second host processor may then transmit streams to a third processor, which aggregates all sensor information from the rear of the vehicle. This third host processor may then transmit information to a central processing system.

The vehicle onboard network according to various embodiments may be a time division multiple access (TDMA) network. Data transmitted over the TDMA vehicle onboard network may be transmitted in data packets corresponding to time slots of predetermined, fixed durations. Nodes in the vehicle onboard network may be synchronized to a central clock. Such a synchronous, reserved TDMA communication scheme may allow guaranteed Quality of Service (QoS) communications, avoiding packet collisions and competing transmissions in the same time slots.

As one example, a vehicle may have two front cameras, two side mirror cameras and three rear cameras. In this embodiment, a first host processor may connect to the two front cameras, a second host processor may connect to the two side mirrors and a third host processor may connect to the three rear cameras. The three host processors connect to a central processing unit over a TDMA network. Each host processor may be assigned specific time slots on the TDMA network for transmitting images from the sensors attached to that processor. The first host processor may be allocated time slots 1 and 2 for sending an image from each of the two front connected cameras. The second host processor may be given time slots 3 and 4 for transmitting images from the two side mirror cameras. The third host processor may be given time slots 5, 6, and 7 for transmitting image from the three rear cameras. Each host processor then transmits data from its connected cameras according to the time slots it has been allocated. Additional details on this system are described below.

Figure 1:
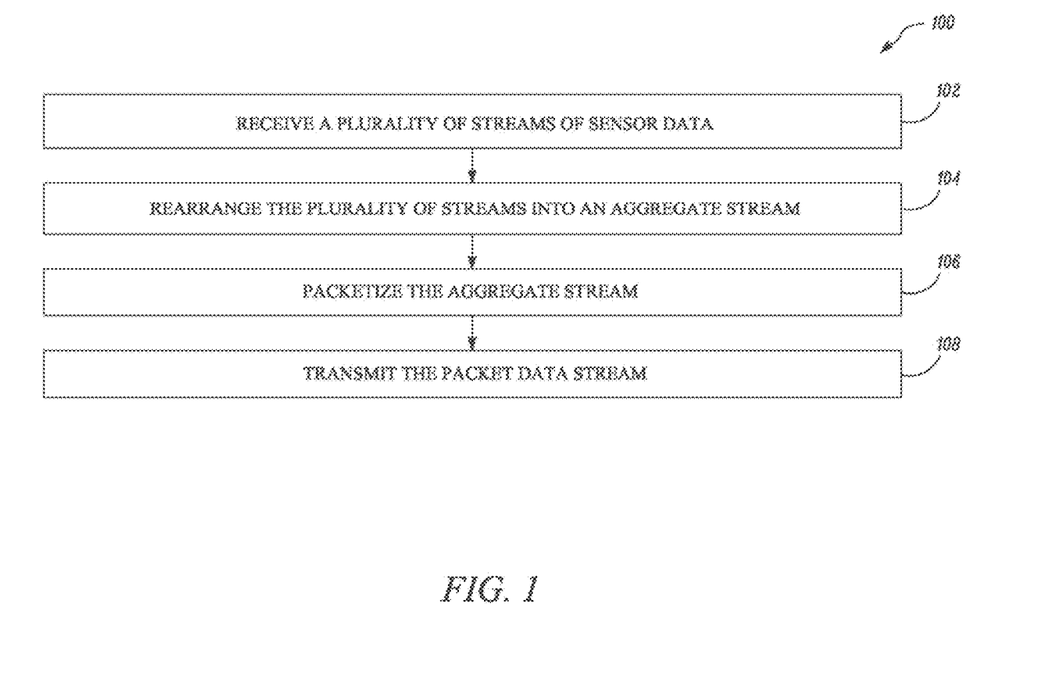
FIG. 1 illustrates a flowchart of a method for aggregating and converting sensor data, according to embodiments of the present invention.

FIG. 1 illustrates a flowchart 100 of a method for aggregation and conversion of sensor data streams, according to certain embodiments. Such a method may be implemented on general purpose processors or on specialized hardware designed particularly for such aggregation and conversion. Hereinafter, such a hardware will be referred to as a host processor, without limiting it to any particular implementation.

At step 102, the host processor receives a plurality of streams of sensor data. The host processor may receive the streams of sensor data over two or more serial interfaces. In various embodiments, the serial interface may be a Camera Serial Interface (CSI), or subsequent variations thereof, conforming to the CSI standards set forth by the Mobile Industry Processor Interface (MIPI) Alliance.

In various embodiments, the host processor receives the sensor data from two or more camera sensors. The camera sensors may be imaging sensors such as CMOS sensors, or TTL sensors. Further, such camera sensors may have Bayer filters, to simplify depth map processing, for example. Stereoscopic camera sensors may be considered as a pair of sensors, when the stereoscopic camera sensors are arranged as a single sensing module with no onboard processing apart from data transmission formatting and generate two separate streams of sensor data. Alternatively, stereoscopic camera sensors may be considered as a single sensor unit, if they have onboard data aggregation, thereby generating a single stream of sensor data. A similar treatment may be applied to array sensors.

In other embodiments, the host processor receives the sensor data streams from two or more detection and ranging (DAR) sensors. The DAR sensors may include radio-based sensors such as RADAR, or light-based or laser-based sensors such as LIDAR, ultrasonic sensors, or sound based sensors such as SONAR. Similar to the treatment of stereoscopic sensor units described above, array DAR sensors may be treated as a single sensor unit if they collectively generate a single aggregate sensor data stream and treated as multiple sensors if they individually generate their own sensor data streams without any onboard processing to aggregate the plural sensor data streams.

In yet other embodiments, the host processor receives the sensor data streams from any combination of camera sensors and DAR sensors.

Sensor data streams from DAR sensors are time domain data, and may need conversion to a frequency domain representation, for further downstream processing. Therefore, in embodiments where the host processor receives sensor data streams from one or more DAR sensors, the host processor may further apply a Fast Fourier Transform (FFT) operation to the stream of sensor data originating from the DAR sensors.

At step 102, the host processor rearranges the plurality of streams of sensor data into an aggregate stream. In one embodiment, the host processor does not buffer the received sensor data as it arrives and is interleaved with data streams coming from other sensors. The host processor may interleave the streams in a manner that the aggregate stream has data units of different streams arriving at or about the same instance of time are grouped together.

In some embodiments, the host processor may assign time slots within the TDMA network to sensors from which the host processor receives sensor information. For example, there may be 8, 10, and so on, slots available. The host processor may then include sensor information from a particular sensor in an assigned slot if the particular sensor transmitted information. The host processor may optionally cause the slot to be empty if the particular sensor did not transmit information. In some embodiments, each slot may be of a particular fixed size. For example, each slot may be of a size corresponding to a size of an image. In some embodiments, the slots may be of differing sizes. For example, a first slot may be used to transmit a first type of sensor information (e.g., radar information) while a second slot may be used to transmit a second type of sensor information (e.g., images). In some embodiments, two or more slots may be assigned to a same sensor. In some embodiments, a sensor may transmit a portion of sensor information via an assigned slot (e.g., a portion of an image). Subsequent to transmission of the portion, the sensor may transmit a remaining portion of the sensor information via the assigned slot.

The host processor may further rely on timing/synchronization signals from an onboard clock within the network for aggregating the streams of sensor data. Alternatively, the host processor may only rely on its own internal clock and timing circuitry to aggregate the streams of sensor data. This includes adjusting for propagation delays in the transmission lines (or network cables or wiring) in the vehicle. The host processor may either have propagation delays pre-programmed into its memory, or may measure it periodically, or employ both methods.

At step 106, the host processor packetizes the aggregate stream obtained in step 104. In the packetizing operation, the host processor treats the aggregate stream as payload data and adds on appropriate bits or bytes of data that conform to the final packet structure of a transmission packet data format. Such bits or bytes of data are referred to as transmission format bits. With respect to slots, the host processor may thus packetize the information included in the slots.

The host processor may add packet header information before each payload packet, or other formatting information after the payload packet, or both. The transmission format bits may include, without limitation, source address, destination address, flags, payload length, padding bits, error detection information, error correction information, and so forth.

Optionally, the host processor may apply compression to the aggregate stream during packetizing. For example, lossless compression may be used. In one embodiment, the lossless compression technique may be Display Stream Compression (DSC). As another example, lossy compression may be used. For example, images may be reduced in size using example compression techniques (e.g., jpeg, HEIC, and so on). Such compression allows for higher throughput data transmission.

In further embodiments, the host processor may encrypt the packet data stream before transmission. In one such embodiment, the encryption technique conforms to the High-bandwidth Digital Content Protection (HDCP) standard.

At step 108, the host processor transmits the packet data stream over a vehicle on-board packet data link. In some embodiments the vehicle on-board packet data link conforms to the DisplayPort standard. In other embodiments, the vehicle on-board packet data link may conform to other standards such as High Definition Media Interface (HDMI), Gigabit ethernet, Thunderbolt, PCIe Gen 3, or Universal Serial Bus (USB)—particularly Superspeed (USB 3) and later versions. As described herein, the host processor may transmit the packet data stream to a particular location (e.g., a central processing system, another host processor, and so on).

Figure 2:
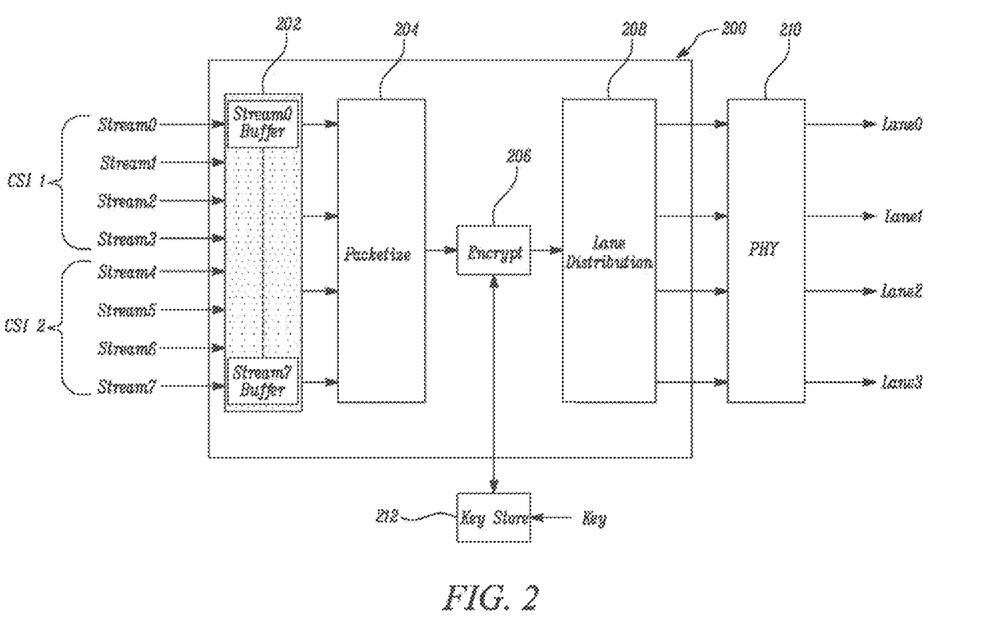
FIG. 2 illustrates a functional block diagram of an aggregation and format conversion module, according to embodiments of the present invention.

FIG. 2 illustrates a functional block diagram of an aggregation and format conversion module 200, according to certain embodiments. The aggregation and format conversion module 200 includes a stream buffer 202, a packetizer 204, an encryption module 206, a lane distribution module 208, a physical interface 210, and a key store 212.

The aggregation and format conversion module 200 receives a plurality of streams of sensor data. The host processor may receive the streams of sensor data over two or more serial interfaces—depicted as CSI1 and CSI2 in FIG. 2. However, other serial interfaces are also envisioned by other embodiments.

In the example embodiment illustrated in FIG. 2, the aggregation and format conversion module 200 receives sensor data from two camera or DAR sensors, or a combination thereof.

The camera sensors may be imaging sensors such as CMOS sensors, or TTL sensors. Further, such camera sensors may or may not have Bayer filters, to simplify depth map processing, for example. Stereoscopic camera sensors may be considered as a pair of sensors, when the stereoscopic camera sensors are arranged as a single sensing module with no onboard processing apart from data transmission formatting and generate two separate streams of sensor data. Alternatively, stereoscopic camera sensors may be considered as a single sensor unit, if they have onboard data aggregation, thereby generating a single stream of sensor data. A similar treatment may be applied to array sensors.

The DAR sensors may include radio-based sensors such as RADAR, light-based or laser-based sensors such as LIDAR, ultrasonic sensors, or sound based sensors such as SONAR. Similar to the treatment of stereoscopic sensor units described above, array DAR sensors may be treated as a single sensor unit if they collectively generate a single aggregate sensor data stream and treated as multiple sensors if they individually generate their own sensor data streams without any onboard processing to aggregate the plural sensor data streams.

The stream buffer 202 buffers the received sensor data streams for interleaving and alignment, as it arrives. The stream buffer 202 may interleave the data units from the streams. The stream buffer 202 may interleave the streams in a manner that the aggregate stream has data units of different streams arriving at or about the same instance of time are grouped together.

The packetizer 204 then rearranges the plurality of streams of sensor data into an aggregate stream. The packetizer 204 and stream buffer 202 work in close conjunction to form the aggregate data stream.

The packetizer 204 may further rely on timing/synchronization signals for aggregating the streams of sensor data. Alternatively, the packetizer 204 may only rely on the internal clock and timing circuitry of the aggregation and conversion module 200 to aggregate the streams of sensor data. This includes adjusting for propagation delays in the transmission lines (or network cables or wiring) in the vehicle. The host processor may either have propagation delays pre-programmed into its memory, or may measure it periodically, or employ both methods.

Further in the packetizing operation, the packetizer 204 treats the aggregate stream as payload data and adds appropriate bits or bytes of data that conform to the final packet structure of a transmission packet data format. Such bits or bytes of data are referred to as transmission format bits.

The packetizer 204 may then add packet header information before each payload packet, or other formatting information after the payload packet, or both. The transmission format bits may include, without limitation, source address, destination address, flags, payload length, padding bits, error detection information, error correction information, and so forth.

Optionally, packetizer 204 may also apply lossless compression to the aggregate stream during packetizing. In one embodiment, the lossless compression technique may be Display Stream Compression (DSC). Such compression allows for higher throughput data transmission.

In the illustrated embodiment, the encryption module 206 may encrypt the packet data stream before transmission. In one such embodiment, the encryption technique conforms to the High-bandwidth Digital Content Protection (HDCP) standard. The encryption module 206 may communicate with the key store 212 to access encryption keys that may be shared among other devices that are the intended recipients of the encrypted packet data stream.

The lane distribution module 208 rearranges the packet data stream into one or more lanes of traffic. The lanes may be specific to multi-lane packet data networks, such as those deployed in the DisplayPort interface. Multi-lane links provide higher throughput by means of parallel data transmission.

The physical interface 210 then encodes the packet data stream with physical layer protocols and transmits the packet data stream over a high-speed packet data network. In the illustrated embodiment, the high-speed packet data network is a multi-lane packet data network such as DisplayPort. However, single lane serial packet data networks are also envisioned in other embodiments, without limitation.

Figure 3:
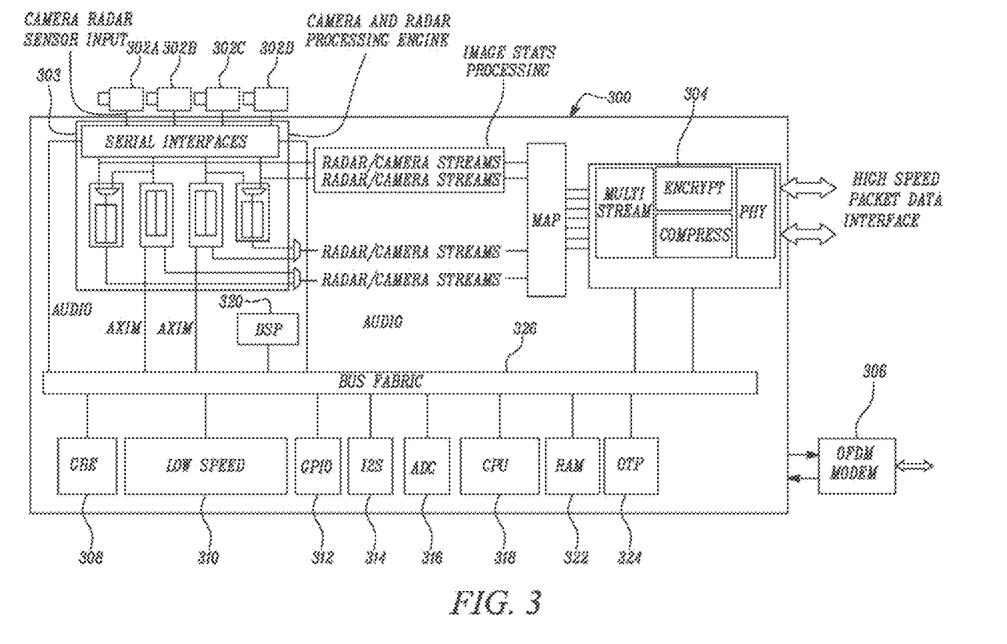
FIG. 3 illustrates a block diagram of a host processor, according to embodiments of the present invention.

FIG. 3 illustrates a block diagram of a host processor 300, according to certain embodiments. The host processor 300 receives sensor data streams from sensors 302A, 302B, 302C, and 302D. The sensors 302A, 302B, 302C, and 302D may be camera sensors or DAR sensors or a combination thereof. Other sensors may additionally be used and fall within the scope of the present disclosure. The host processor 300 may also be communicably coupled to a high-speed packet data interface and a low speed PLC modem 306.

The host processor 300 includes a camera and radar processing engine 303, an aggregation and format conversion module 304, a variety of interfaces including a gigabit ethernet interface 308, a low speed interface 310, a General Purpose I/O interface (GPIO) 312, and an I2S interface 314. The host processor 300 further includes various processing modules including an Analog to Digital convertor (ADC) 316, a general-purpose CPU 318, a general-purpose digital signal processor (DSP) 320, a random-access memory (RAM) 322, and a One Time Programmable (OTP) ROM 324. The various modules of the host processor 300 are interconnected with a bus fabric 324.

The camera and radar processing engine 303 includes camera and radar sensor input ports communicably coupled to the sensors 302A, 302B, 302C, and 302D. The input ports may be part of serial interfaces, such as a Camera Serial Interface (CSI). The camera and radar processing engine 303 further includes circuitry to process the input data streams received from sensors 302A, 302B, 302C, and 302D. In some embodiments, where the sensors 302 are DAR sensors, the camera and radar processing engine 303 includes FFT circuitry to process input data streams received from such DAR sensors. Such a circuitry is explained in greater detail in conjunction with FIG. 4 below.

The camera and radar processing engine 303 provides radar/camera streams to the aggregation and format conversion module 304. The camera and radar processing engine 303 provides the data streams, as well as image stats of the radar/camera streams. The image stats may include parameters such as, but not limited to, exposure values, image histograms, and so forth.

Although the host processor 300 is depicted as various blocks, it may be implemented as specialized hardware for any number of interfaces and processing modules, or as a general-purpose microprocessor system. In the case of a general-purpose microprocessor-based implementation, a non-transitory computer readable medium such as a flash memory, or a secondary storage device such as a solid-state drive or a hard disk drive has stored thereon, computer readable instructions in the form of software or firmware. The computer readable instructions could then be executed by the general-purpose microprocessor system to execute various functions and operations of the host processor 300, and/or the aggregation and format conversion module 200.

Figure 4:
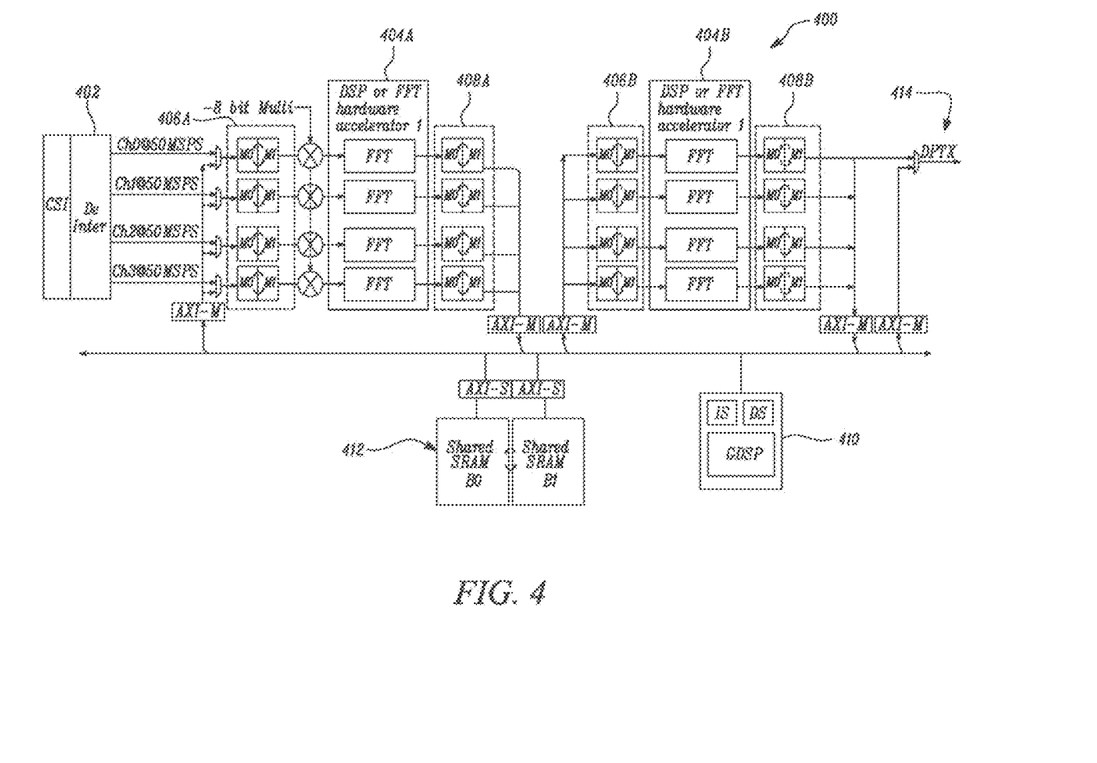
FIG. 4 illustrates a block diagram of a detection and ranging (DAR) signal processing module, according to embodiments of the present invention.

FIG. 4 illustrates a block diagram of a detection and ranging (DAR) signal processing module 400, according to certain embodiments. The DAR signal processing module 400 includes a CSI interface 402, FFT hardware accelerators 404A and 404B, input ping-pong buffers 406A and 406B, output ping-pong buffers 408A and 408B, a general-purpose DSP 410, and a high-speed SRAM 412. The components of the DAR signal processing module 400 may be communicably coupled over a high-performance fabric such as the AXI interconnect.

The CSI interface 402 is configured to receive sensor data streams from DAR sensors. The CSI interface 402 may also include a de-interleaver to convert the serial sensor data stream received over CSI into a multi-channel stream (for example, a 4-channel stream) for faster processing.

The FFT hardware accelerators 404A and 404B may be specialized hardware circuitry for high-performance FFT computation. Alternatively, the FFT hardware accelerators 404A and 404B may be implemented as high-performance DSP accelerated FFT processors. In various embodiments the FFT hardware accelerators 404A and 404B may be programmable to do various different fixed point FFTs such as 128 point, 256 point, 512 point, 1024 point, or any other size apart from these exemplary fixed point FFT implementations. The FFT hardware accelerators 404A and 404B may also support a bypass mode, for passing the data through directly, without FFT processing.

Memory interface to the input of the FFT hardware accelerators 404A and 404B are structured as ping-pong buffers 406A and 406B respectively. Similarly, memory interface at the output of the FFT hardware accelerators 404A and 404B are structured as ping-pong buffers 408A and 408B respectively.

The high-speed SRAM 412 is a shared memory and may be used as a frame ping-pong buffer.

FFT hardware accelerator 404A is configured to be able to process data from the CSI interface 402 or read from high-speed SRAM 412. FFT hardware accelerator 404B is configured to write data to the high-speed SRAM 412 or send it directly to transmission interface 414.

Figure 5:
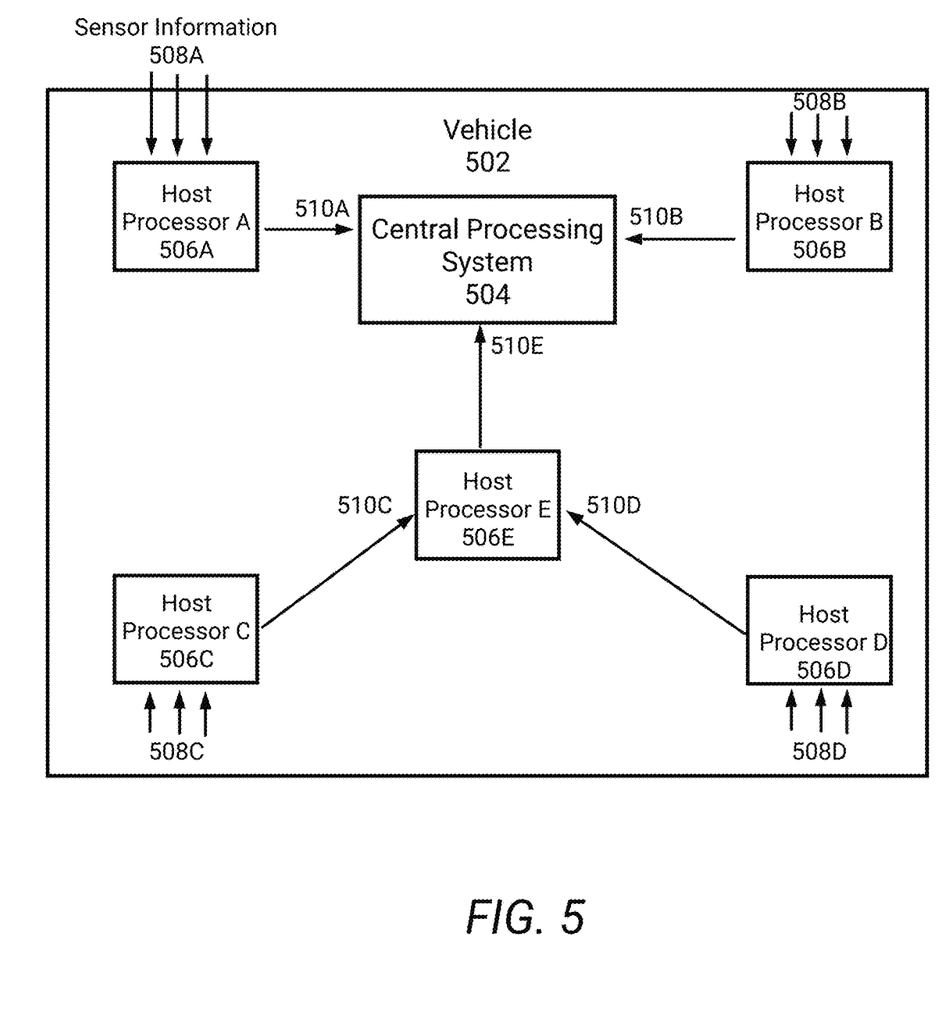
FIG. 5 illustrates an example block diagram of a vehicle using a vehicle onboard network as described herein.

FIG. 5 illustrates an example block diagram of a vehicle 502 using a vehicle onboard network as described herein. In the illustrated vehicle 502, multiple host processors 506A-506E are positioned about the vehicle 502. In the illustrated example, the host processors 506A-506E are transmitting packet data streams 510A-510E. Description of generating packet data streams is included above, with respect to at least FIG. 1. A portion of the host processors 506A-506D are illustrated as receiving sensor information 508A-508D from one or more sensors. As described above, the packet data streams may therefore include packetized representations of these sensor information. For example, the packet data streams may leverage TDMA techniques.

A central processing system 504 is illustrated as being included in the vehicle 502. The central processing system 504 may be positioned in a particular portion of the vehicle 502 (e.g., a front portion). In some embodiments, the central processing system 504 may be a system of one or more processors and may optionally include application specific integrated circuits (ASICs) to perform machine learning processes. Due to the complexity of the central processing system 504, the vehicle may include one system to analyze all sensor information generated by sensors positioned about the vehicle 502. In some embodiments, there may be two or more systems to analyze sensor information.

As illustrated, host processor A 506A and host processor B 506B are providing packet data streams 510A-510B to the central processing system 504. These host processors 506A-506B are aggregating sensor information 508A-508B from particular sensors. For example, the sensors may be located proximate to the host processors 506A-506B. Similarly, host processors 506C-506D are illustrated as aggregating sensor information 510C-510D. However, host processors 506C-506D are providing packet data streams to host processor 506E. For example, host processor 506E may be used to repeat the information provided by host processors 510C-510D to a further location (e.g., central processing system 504). As an example, host processor 506E may interleave the information (e.g., packet data streams) generated by host processors 506C-506D. In some embodiments, host processor 506E may receive information from one host processor (e.g., host processor 506C) and repeat the information to the further location.

In this way, the vehicle 502 may include a threshold quantity of host processors. The host processors, as described herein, may be used to aggregate and/or repeat information. In this way, a complicated vehicle onboard network may be created. Advantageously, the host processors may leverage TDMA techniques to ensure timely, and reliable, transmission of sensor information.

What is claimed is:

1. A method of aggregating and transmitting data in a vehicle, the vehicle comprising a plurality of host processors positioned about the vehicle, and the method comprising:
   receiving, by a first host processor of the plurality of host processors, a plurality of streams of data over two or more Camera Serial Interfaces (CSI);
   rearranging, by the first host processor, the plurality of streams of data into an aggregate stream;
   packetizing, by the first host processor, the aggregate stream by arranging transmission format bits at appropriate bit positions of the aggregate stream to form a packet data stream; and
   transmitting, by the first host processor, the packet data stream over a vehicle on-board packet data link,
   wherein in a first mode, the first host processor receives the streams of data from two or more sensors, such that the packet data stream comprises aggregated sensor information from the sensors,
   and wherein in a second mode, the first host processor receives the streams of data from at least one additional host processor of the plurality of host processors, such that the packet data stream repeats the streams of data via the vehicle on-board packet data link.

2. The method of claim 1, wherein the vehicle on-board packet data link conforms to the DisplayPort standards.

3. The method of claim 1, further comprising applying lossless compression to the aggregate stream during packetizing.

4. The method of claim 1, further comprising encrypting the packet data stream before transmission.

5. The method of claim 4, wherein the encryption conforms to the High-bandwidth Digital Content Protection (HDCP) standard.

6. The method of claim 1, wherein the sensor data is received from two or more camera sensors, two or more detection and ranging (DAR) sensors, or a combination of two or more camera sensors and DAR sensors.

7. The method of claim 1, further comprising applying a Fast Fourier Transform (FFT) operation to the stream of sensor data, wherein at least a portion of the data is received from a DAR sensor.

8. An apparatus for data aggregation and conversion, the apparatus being positioned within a vehicle, and the apparatus comprising:
   two or more Camera Serial Interfaces (CSI) configured to receive a plurality of streams of data; and
   a processor configured to execute instructions stored in a non-transitory computer storage medium, wherein the processor is configured to:
   rearrange the plurality of streams of sensor data into an aggregate stream;
   arrange transmission format bits at appropriate bit positions of the aggregate stream to form a packet data stream; and
   transmit the packet data stream over a vehicle on-board packet data link,
   wherein in a first mode, the apparatus is configured to receive the streams of data from two or more sensors, such that the packet data stream comprises aggregated sensor information from the sensors,
   and wherein in a second mode, the apparatus is configured to receive streams of data from at least one additional apparatus of the plurality of apparatuses positioned within the vehicle, such that the packet data stream repeats the streams of data via the vehicle on-board packet data link.

9. The apparatus of claim 8, wherein the packet data interface conforms to the DisplayPort standard.

10. The apparatus of claim 8, wherein the processor is further configured to apply lossless compression to the aggregate stream, before arranging the transmission format bits.

11. The apparatus of claim 8, wherein the processor is further configured to encrypt the packet data stream before transmission.

12. The apparatus of claim 11, wherein the encryption engine conforms to the High-bandwidth Digital Content Protection (HDCP) standard.

13. The apparatus of claim 8, wherein the processor is further configured to apply an FFT operation to the stream of data, wherein at least a portion of the stream of data is is received from a DAR sensor.

14. A non-transitory computer readable medium having stored thereon instructions, which when executed by a processor positioned within a vehicle, cause the processor to:
   receive a plurality of streams of data over two or more Camera Serial Interfaces (CSI);
   rearrange the plurality of streams of data into an aggregate stream;
   packetize the aggregate stream by arranging transmission format bits at appropriate bit positions of the aggregate stream to form a packet data stream; and
   transmit the packet data stream over a vehicle on-board packet data link, wherein in a first mode, the processor is configured to receive the streams of data from two or more sensors, such that the packet data stream comprises aggregated sensor information from the sensors, and wherein in a second mode, the processor is configured to receive streams of data from at least one additional processor of the plurality of processors positioned within the vehicle, such that the packet data stream repeats the streams of data via the vehicle on-board packet data link.

15. The non-transitory computer readable medium of claim 14, wherein the vehicle on-board packet data link conforms to the DisplayPort standard.

16. The non-transitory computer readable medium of claim 14, further comprising instructions to apply lossless compression to the aggregate stream during packetizing.

17. The non-transitory computer readable medium of claim 14, further comprising instructions to encrypt the packet data stream before transmission.

18. The non-transitory computer readable medium of claim 14, wherein the encryption conforms to the High-bandwidth Digital Content Protection (HDCP) standard.

19. The non-transitory computer readable medium of claim 14, further comprising instructions to apply a Fast Fourier Transform (FFT) operation to the stream of data, wherein at least a portion of the data is received from a DAR sensor.

* * * * *

UNITED STATES PATENT AND TRADEMARK OFFICE
CERTIFICATE OF CORRECTION

PATENT NO. : 10,965,728 B2  
APPLICATION NO. : 16/659432  
DATED : March 30, 2021  
INVENTOR(S) : Adnan Esmail Page 1 of 1

It is certified that error appears in the above-identified patent and that said Letters Patent is hereby corrected as shown below:

In the Claims

In Column 10, Claim 6, Line 6, after "the" delete "sensor".

In Column 10, Claim 7, Line 12, before "data," delete "sensor".

In Column 10, Claim 8, Line 22, after "of" delete "sensor".

In Column 10, Claim 13, Line 53, after "is" delete "is".

Signed and Sealed this  
Twenty-first Day of September, 2021

Drew Hirshfeld  
*Performing the Functions and Duties of the  
Under Secretary of Commerce for Intellectual Property and  
Director of the United States Patent and Trademark Office*